United States Patent [19]

Hennings et al.

[11] Patent Number: 4,503,482
[45] Date of Patent: Mar. 5, 1985

[54] CERAMIC DIELECTRIC BASIS ON BISMUTH-CONTAINING BATIO$_3$

[75] Inventors: Detlev Hennings; Herbert Schreinemacher, both of Aachen, Fed. Rep. of Germany

[73] Assignee: U.S. Philips Corporation, New York, N.Y.

[21] Appl. No.: 536,482

[22] Filed: Sep. 28, 1983

[30] Foreign Application Priority Data

Oct. 9, 1982 [DE] Fed. Rep. of Germany ....... 3237571

[51] Int. Cl.$^3$ .......................... H01B 3/02; C04B 35/46
[52] U.S. Cl. ...................................... 361/321; 501/136
[58] Field of Search ................. 361/321; 501/136, 137

[56] References Cited

U.S. PATENT DOCUMENTS

| | | | |
|---|---|---|---|
| 2,369,327 | 2/1945 | Wainer | 361/321 X |
| 3,619,744 | 11/1971 | Stephenson | 501/137 |
| 3,676,351 | 7/1972 | Taki et al. | 361/321 X |
| 4,017,320 | 4/1977 | Fujiwara et al. | 501/136 |

Primary Examiner—Donald A. Griffin
Attorney, Agent, or Firm—Marc D. Schechter

[57] ABSTRACT

Ceramic dielectric based on bismuth-containing BaTiO$_3$ in the form of a monophase mixed crystal-ceramic in which 0.02 to 0.12 mol of the layer perovskite PbBi$_4$Ti$_4$O$_{15}$ or SrBi$_4$Ti$_4$O$_{15}$ per mol of BaTiO$_3$ are provided. On account of its comparatively low sintering temperature and in particular on account of the very small change of the value of the relative dielectric constant with applied direct voltage fields, the ceramic is particularly suitable for the manufacture of multilayer capacitors.

14 Claims, 2 Drawing Figures

CERAMIC DIELECTRIC BASIS ON BISMUTH-CONTAINING BATIO₃

BACKGROUND OF THE INVENTION

The invention relates to a ceramic dielectric based on bismuth-containing $BaTiO_3$. The invention further relates to the use of this ceramic dielectric in multilayer capacitors.

In the trend toward of the miniaturization of electronic circuits, the requirement for capacitors having small dimensions and large capacitances is becoming increasingly important. In principle the following, the capacitance can be increased by:

1. Increasing the area of the dielectric,
2. Increasing the relative dielectric constant, $\epsilon_{rel}$, and
3. Reducing the thickness of the dielectric.

In order to increase the area of a dielectric, few possibilities are available. This is because the maximum possible area is fixed by a series of secondary conditions, for example production machines and size restrictions with respect to the subsequent use of the capacitors.

It is known to achieve an increase of the area of the dielectric without a substantial increase of the dimensions of the finished component via so-called multilayer capacitors, in which thin ceramic foils are stacked with metallic electrodes to form a laminated packet which is then sintered to form a finished component. With the multilayer construction capacitors can be miniaturized with simultaneous higher capacitance values.

A further increase of the capacitance values of capacitors with miniature dimensions is possible when dielectrics are used having comparatively high relative dielectric constants. It is generally known to achieve an increase of the relative dielectric constant, $\epsilon_{rel}$, by using ferroelectric materials, for example mixed crystals of $BaTiO_3$, in which values of $\epsilon_{rel}=2,000$ to $\epsilon_{rel}=10,000$ are known. With an increasing dielectric constant $\epsilon_{rel}$, however, the materials become more and more unstable so that the dependence of the dielectric constant on temperature and field strength consequently deteriorates considerably. Since the occurrence of these instabilities is coupled directly with the $\epsilon$-increase, the physically possible limits of these materials have already been reached.

Although $BaTiO_3$ has a comparatively high relative dielectric constant, $\epsilon_{rel}$, it is particularly difficult to construct multilayer capacitors from this material. The temperatures which are required for densely sintering $BaTiO_3$ are so high that the electrodes of the multilayer capacitors, which are to be provided prior to sintering the ceramic dielectric, must consist of high-melting-point noble metals, for example palladium.

Experiments have been carried out to manufacture dielectrics for multilayer capacitors based on $BaTiO_3$, in which the sintering temperature was reduced from a first range of 1300° to 1350° C. (for pure $BaTiO_3$) to 1080° to a second range of 1100° C. by the addition of $PbBi_4Ti_4O_{12}$ in quantities from 2.5 to 4.75 mol.% and an extra addition of 1 to 2.25 mol.% $BaO.Nb_2O_5$, $BaO.Ta_2O_5$, $PbO.Nb_2O_5$ and/or $PbO.Ta_2O_5$. With this known ceramic, dielectric constants of $\epsilon_{rel}=1200$ to 1800 can be achieved. These dielectrics also exhibit a comparatively good temperature stability of the dielectric constant of $\pm 17\%$ over a temperature range from $-50°$ C. to $+130°$ C. (Compare, U.S. Pat. No. 3,619,744.)

With the trend toward increasing miniaturization of components for so-called hybrid circuits, it has proved desirable to improve the parameters of the known ceramic as much as possible. For example, it is desired to achieve a higher relative dielectric constant, without increasing the sintering temperature and without increasing the dependence of the dielectric constant on temperature and on field strength.

SUMMARY OF THE INVENTION

It is an object of the invention to provide an improved ceramic dielectric based on bismuth-containing $BaTiO_3$ in such manner that higher values are achieved for the relative dielectric constant with simultaneously improved values for the temperature stability of the dielectric constant. The sintering temperature, however, remains on the order of magnitude of that of the known ceramic. Yet, a particularly high voltage stability is achieved with applied direct voltage fields.

According to the invention this object is achieved in that the dielectric is a monophase ceramic in the form of a mixed crystal which contains 0.02 to 0.12 mol of the layer perovskite $PbBi_4Ti_4O_{15}$ or $SrBi_4Ti_4O_{15}$ per mol of $BaTiO_3$.

According to an advantageous further embodiment of the invention the mixed crystal comprises 0.03 to 0.06 mol $PbBi_4Ti_4O_{15}$ or $SrBi_4Ti_4O_{15}$ per mol of $BaTiO_3$.

According to a particularly favorable further embodiment of the invention the mixed crystal comprises 0.03 mol of $SrBi_4Ti_4O_{15}$ per mol of $BaTiO_3$.

This monophase ceramic is particularly advantageous of practical purposes: the life behavior is not unessentially improved as compared with a mixed crystal which contains $PbBi_4Ti_4O_{15}$. This also applies to mixed crystals comprising a content higher than 0.03 mol $SrBi_4Ti_4O_{15}$ per mol of $BaTiO_3$.

The advantage of an addition of $PbBi_4Ti_4O_{15}$ resides in lower sintering temperatures as compared with the sintering temperatures required for mixed crystals having an addition of $SrBi_4Ti_4O_{15}$.

The mentioned layer perovskites $PbBi_4Ti_4O_{15}$ and $SrBi_4Ti_4O_{15}$ form mixed crystals with $BaTiO_3$. The mixed crystal has a sintering temperature of 1100° to 1150° C., which is considerably than pure $BaTiO_3$ (1300° to 1350° C.) although the added quantities of the layer perovskites with 0.03 t0 0.12 and preferably 0.03 to 0.04 mol/mol $BaTiO_3$ are comparatively small.

This reduced sintering temperature has the great advantage. The ceramic can be used as a dielectric for multilayer capacitors in which the electrode metal is provided on the green, hence unsintered, ceramic. The sintering of the ceramic with the electrodes is at a low temperature. Hence, no pure noble metals, for example palladium, need to be used. Pure noble metals are required in ceramics having higher sintering temperatures due to the melting point of the electrode metal. In the present ceramic, alloys may advantageously be used for the electrodes which have alloy constitutents of lower melting-points, for example silver. The electrode metals advantageously used for ceramics of the present type consist of silver-palladium alloys with a preponderant share of silver (60 to 70% by weight).

A further advantage of the ceramic dielectric according to the invention is that relative dielectric constants with values of $\epsilon_{rel}=2800$ can be achieved. The known ceramic based on $BaTiO_3$ with additions of $PbBi_4Ti_4O_{15}$ +$BaO.Nb_2O_5$, $BaO.Ta_2O_5$, $PbO.Nb_2O_5$ or $PbO \cdot Ta_2O_5$ in contrast have values for the relative dielectric constant of only $\epsilon_{rel} \leq 2000$.

The increased values for the dielectric constant, $\epsilon_{rel}$, in the ceramic according to the invention are extraordinarily stable in a temperature range from $-30°$ C. to $+125°$ C. This is a considerable improvement as compared with the known dielectric based on the $BaTiO_3$. The value varies by only $\pm 10\%$ from the values for the relative dielectric constant, $\epsilon_{rel}$, at room temperature (25° C.). A few of the compositions according to the invention vary by less than $\pm 15\%$ in the temperature range from $-55°$ C. to $+125°$ C. The known ceramic is more unfavorable with a deviation of $\pm 17\%$ in the temperature range from $-50°$ C. to 130° C. This temperature range is of importance for practical purposes.

The most important advantage of the claimed ceramic, is the very small change of the value for the relative dielectric constant with applied direct voltage fields. For example, the relative dielectric constant, $\epsilon_{rel}$, measured at 1 kHz with simultaneously applied direct voltage fields of 10 kV/cm changes less than 1.5%. Surprisingly this property has appeared over the whole claimed composition range and makes the use of these materials in multilayer capacitors having particularly thin dielectric ceramic layers particularly interesting. In addition, the multilayer capacitors are densely sintered at comparatively low sintering temperatures and hence can be manufactured with electrodes comprising preponderantly metals having melting-points below 1000° C.

DESCRIPTION OF THE PREFERRED EMBODIMENTS

Figure 1:
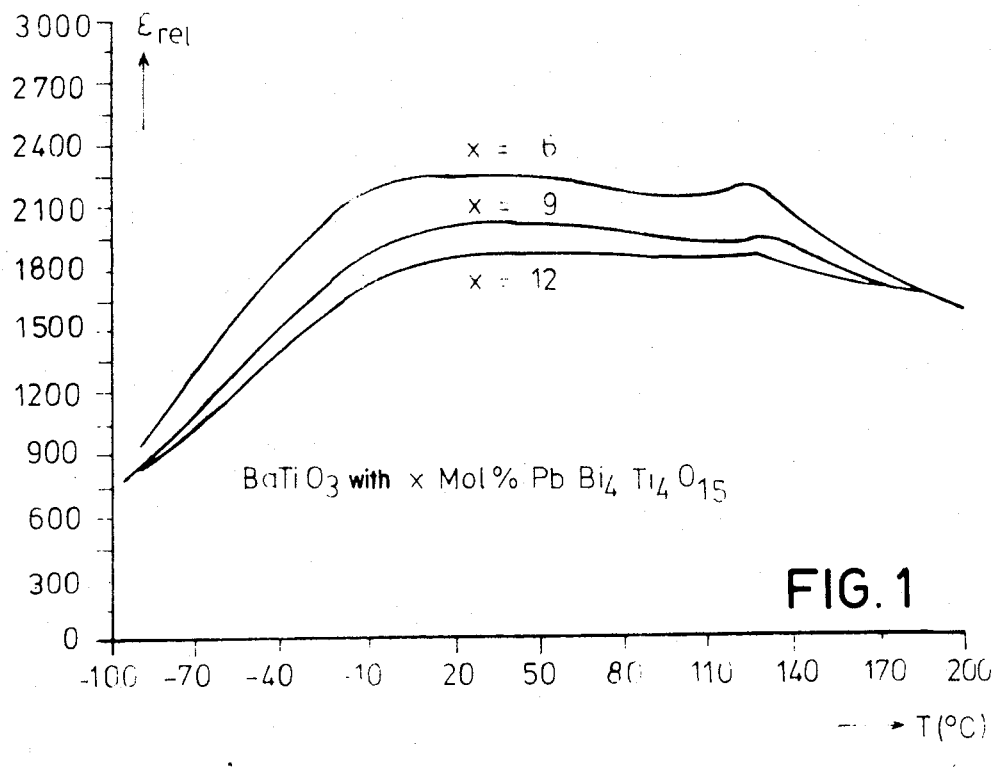
FIGS. 1 and 2 are diagrams of the temperature dependence of the relative dielectric constant, $\epsilon_{rel}$, for ceramic according to the invention.

In FIG. 1 the measured values for the relative dielectric constant, $\epsilon_{rel}$, are plotted against the temperature, T, for ceramics of $BaTiO_3$ with 6, 9 and 12 mol. % $PbBi_4Ti_4O_{15}$. Each composition was sintered in air at a temperature of 1110° C. for 4 hours. A comparatively good temperature stability of the relative dielectric constant appears in the temperature range from $-30°$ C. to $+125°$ C.

Figure 2:
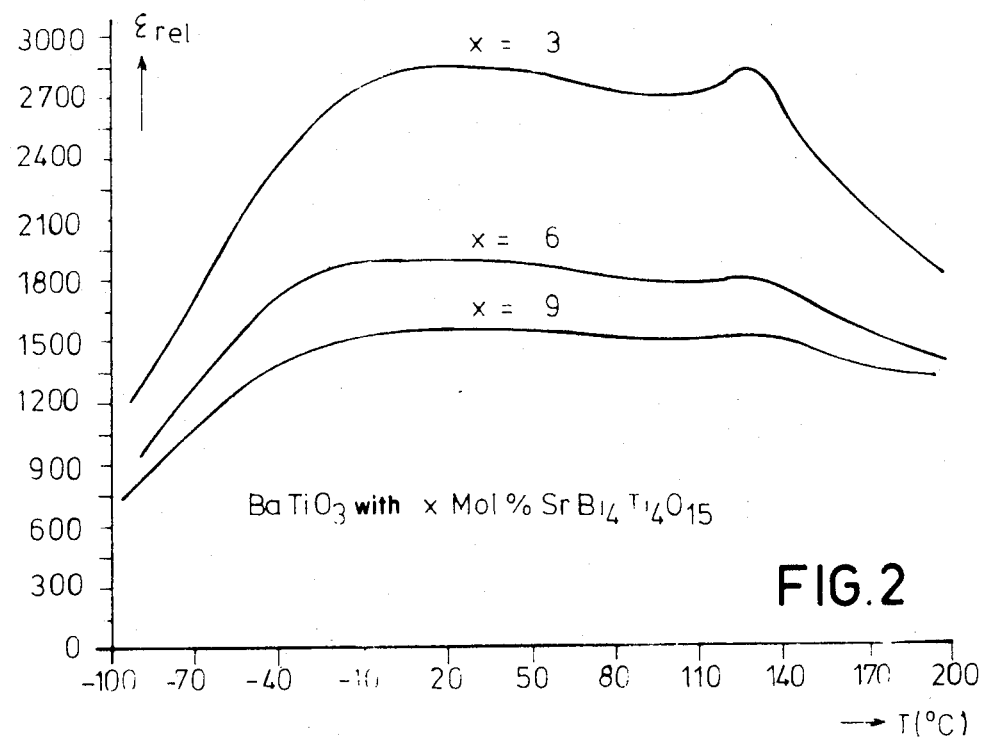

In FIG. 2 the measured values for the relative dielectric constant, $\epsilon_{rel}$, are plotted against the temperature T for a ceramic of $BaTiO_3$ with 3 mol % $SrBi_4Ti_4O_{15}$ which was sintered in air at 1150° C. for 4 hours, and for ceramics of $BaTiO_3$ with 6 and 12 mol % $SrBi_4Ti_4O_{15}$ which were sintered in air at 1110° C. for 4 hours. A comparatively good stability of the values for $\epsilon_{rel}$ in the temperature range from $-30°$ C. to $+125°$ C. appears in this case also.

The starting substances ($BaCO_3$, $TiO_2$, $SrCO_3$, $Bi_2O_3$) required for the mixed crystal ceramic to be manufactured are analytical-grade raw materials which are ground wet in agate ball mills and presintered in a normal atmosphere in a temperature range from 1050° to 1100° C. for 12 to 15 hours. The sintered material is once again pulverized in the corresponding mixing ratios which nominally correspond to the desired mixed crystal to be manufactured. They are then prepared in known manner to form a mass from which foils for multilayer capacitors can be manufactured.

The following process is performed for the manufacture of new multilayer capacitors having a dielectric of the composition $BaTiO_3 \cdot 0.03 SrBi_4Ti_4O_{15}$. Mixtures of the following composition were manufactured: 98.68 g $BaCO_3$ + 39.95 g $TiO_2$ : 2.215 g $SrCO_3$ + 13.98 g $Bi_2O_3$ + 4,794 g $TiO_2$.

The presintered and pulverized composition was suspended in 30% by weight of deionized water by means of a wetting agent. The suspension was mixed collectively with an organic binder, for example polymerized hydrocarbons, and a softener in a dispersion device. Triethylene glycol may be used as a softener.

The suspension thus obtained was degassed at a reduced pressure and stirred with a wetting agent. By means of a revolving steel tape of thin layer of the suspension was drawn out of an overflow container and dried to form approximately 40 $\mu$m thick ceramic foils.

A number of unsintered foil pieces were stacked as was necessary for the desired thickness of the capacitor. Between the foil pieces approximately 8 $\mu$m thick electrode layers were deposited. The electrode layers consisted of Ag/Pd powder (60% by weight Ag, 40% by weight Pd) and an organic binder, for example cellulose acetate.

The stack of foils and electrodes was then compressed and punched out to form monolithic multilayer blocks. The blocks were heated in air at 600° C. at a rate of 0.5° C. per minute so as to evaporate the solvent and to burn out the binders. The blocks were then heated in air at a rate of 3° C. per minute up to 1150° C. and kept at this temperature for sintering for 8 to 10 hours.

After sintering, the blocks were cooled to room temperature at a rate of 3° C. per minute. The sintered monolithic blocks were provided with readily bonding and solderable electric end contacts.

The lifetime behavior of finished contacted capacitors was tested. For this purpose, discs having a diameter of 5 mm and a thickness of 0.5 mm were compressed from the ceramic mass and sintered at the same temperatures as described above and then provided with Cr/Ni/Au electrodes.

The lifetime measurements were carried out at a voltage of 1000 V at a temperature of 125° C. for 1000 hours. It was found that samples with maximally 0.12 mol $SrBi_4Ti_4O_{15}$ per mol of $BaTiO_3$ and with maximum 0.09 mol $PbBi_4Ti_4O_{15}$ per mol of $BaTiO_3$ from approximately 500 hours test duration showed values for the resistivity which were lower by three decimal powers than the resistivity at the beginning of the test. The remaining samples of the compositions recorded in Table 1 showed only slight, even nonmeasurable variations in the values for the resistivity.

The density of the sintered ceramic was approximately 98% of the theoretically achievable density.

In the following Table 1 the dielectric characteristic quantities of capacitors manufactured in the above-described manner with dielectrics from the claimed ceramic are recorded.

TABLE 1 dielectric characteristic quantities of mixed crystals from BaTiO$_3$ with x Mol % layer perowskite addition.

| sample No. | layer perowskite | x (Mol %) | sintering temperature (°C.) | density (g/cm$^3$) | dielectric constant $\epsilon_{rel}$ (25° C.) | dielectric loss factor tan δ (25° C.) | deviation $\Delta\epsilon_{rel}$ from $\epsilon_{rel}$ at 25° C. (%) −55° C. | −30° C. | 85° C. | 125° C. | EIA specification |
|---|---|---|---|---|---|---|---|---|---|---|---|
| 435 | PbBi$_4$Ti$_4$O$_{15}$ | 6 | 1110 | 6.27 | 2250 | 1.8% | −34 | −13 | −4.5 | −11.2 | Y7R |
| 436 | " | 9 | 1110 | 6.37 | 2010 | 1.8% | −37 | −18 | −3 | −1.5 | |
| 437 | " | 12 | 1110 | 6.45 | 1860 | 2% | −35.5 | −13 | −1.7 | −1.7 | Y7R |
| 438 | SrBi$_4$Ti$_4$O$_{15}$ | 3 | 1150 | 6.01 | 2850 | 1% | −22 | −4.3 | −7.5 | −6.4 | Y7R |
| 781a | " | 4 | 1100 | 6.05 | 2230 | 0.7% | −13.5 | −3.4 | −9.5 | −12.8 | X7R |
| 439 | " | 6 | 1110 | 6.13 | 1900 | 0.8% | −11.5 | −4.7 | −5.3 | −4.7 | X7R, Y7F |
| 440 | " | 9 | 1110 | 6.21 | 1560 | 0.8% | −14.5 | −2 | −4 | −4 | X7R, Y7E |
| 441 | " | 12 | 1110 | 6.35 | 1290 | 0.9% | −14 | −2.4 | −2.4 | −2.4 | X7R, Y7D |

In Table 2 are recorded the variations of the dielectric characteristic quantities $\epsilon_{rel}$ and tan δ(%) with applied direct voltages E from 1 to 10 kV/cm for capacitors with dielectrics from the claimed ceramic (samples nos. 435 to 441).

TABLE 2

| Sample No. | E (kV/cm) | $\Delta\epsilon_{rel}$ of $\epsilon_{rel}$ at 25° C. (%) | tan δ (%) |
|---|---|---|---|
| 435 | 1 | +0.19 | 1.47 |
| | 2 | +0.25 | 1.47 |
| | 3 | +0.19 | 1.47 |
| | 4 | +0.19 | 1.46 |
| | 6 | +0.06 | 1.48 |
| | 8 | −0.31 | 1.45 |
| | 10 | −0.75 | 1.44 |
| 437 | 1 | +0.16 | 2.61 |
| | 2 | +0.25 | 2.63 |
| | 3 | +0.33 | 2.65 |
| | 4 | +0.33 | 2.65 |
| | 6 | +0.25 | 2.68 |
| | 8 | +0 | 2.67 |
| | 10 | −0.49 | 2.67 |
| 438 | 1 | +0.16 | 0.95 |
| | 2 | +0.16 | 0.95 |
| | 3 | +0.22 | 0.95 |
| | 4 | +0.11 | 0.94 |
| | 6 | −0.05 | 0.94 |
| | 8 | −0.32 | 0.95 |
| | 10 | −0.81 | 0.95 |
| 439 | 1 | +0.15 | 0.93 |
| | 2 | +0.15 | 0.93 |
| | 3 | +0.23 | 0.95 |
| | 4 | +0.15 | 0.95 |
| | 6 | +0.08 | 0.95 |
| | 8 | −0.23 | 0.94 |
| | 10 | −0.76 | 0.94 |
| 440 | 1 | +0.09 | 0.85 |
| | 2 | +0.18 | 0.86 |
| | 3 | +0.18 | 0.86 |
| | 4 | +0.09 | 0.87 |
| | 6 | +0.09 | 0.88 |
| | 8 | −0.18 | 0.87 |
| | 10 | −0.63 | 0.88 |
| 441 | 1 | +0.11 | 0.91 |
| | 2 | +0.22 | 0.93 |
| | 3 | +0.22 | 0.92 |
| | 4 | +0.22 | 0.94 |
| | 6 | +0.11 | 0.95 |
| | 8 | ±0 | 0.96 |
| | 10 | −0.33 | 0.95 |

What is claimed is:

1. A ceramic dielectric consisting essentially of a monophase ceramic in the form of a mixed crystal of BaTiO$_3$ and 0.02 to 0.12 mol of the perovskite PbBi$_4$Ti$_4$O$_{15}$ for each mol of BaTiO$_3$.

2. A ceramic dielectric as claimed in claim 1, characterized in that the mixed crystal consists essentially of 0.03 to 0.06 mol PbBi$_4$Ti$_4$O$_{15}$ per mol of BaTiO$_3$.

3. A ceramic dielectric as claimed in claim 2, characterized in that the mixed crystal consists essentially of 0.03 to 0.04 mol PbBi$_4$Ti$_4$O$_{15}$ per mol of BaTiO$_3$.

4. A ceramic dielectric consisting essentially of a monophase ceramic in the form of a mixed crystal of BaTiO$_3$ and 0.02 to 0.12 mol of the perovskite SrBi$_4$Ti$_4$O$_{15}$ for each mol of BaTiO$_3$.

5. A ceramic dielectric as claimed in claim 4, characterized in that the mixed crystal consists essentially of 0.03 to 0.06 mol SrBi$_4$Ti$_4$O$_{15}$ per mol of BaTiO$_3$.

6. A ceramic dielectric as claimed in claim 5, characterized in that the mixed crystal consists essentially of 0.03 to 0.04 mol SrBi$_4$Ti$_4$O$_{15}$ per mol of BaTiO$_3$.

7. A ceramic dielectric as claimed in claim 6, characterized in that the mixed crystal consists essentially of 0.03 mol SrBi$_4$Ti$_4$O$_{15}$ per mol of BaTiO$_3$.

8. A ceramic multilayer capacitor comprising:
a plurality of layers of ceramic dielectric material; and
a plurality of layers of metallic electrodes, one metallic electrode layer arranged between two layers of ceramic dielectric;
characterized in that the ceramic dielectric layers consist essentially of a monophase ceramic in the form of a mixed crystal of BaTiO$_3$ and 0.02 to 0.12 mol of the perovskite PbBi$_4$Ti$_4$O$_{15}$ for each mol of BaTiO$_3$.

9. A ceramic multilayer capacitor as claimed in claim 8, characterized in that the mixed crystal consists essentially of 0.03 to 0.06 mol PbBi$_4$Ti$_4$O$_{15}$ per mol of BaTiO$_3$.

10. A ceramic multilayer capacitor as claimed in claim 9, characterized in that the mixed crystal consists essentially of 0.03 to 0.04 mol PbBi$_4$Ti$_4$O$_{15}$ per mol of BaTiO$_3$.

11. A ceramic multilayer capacitor comprising:
a plurality of layers of ceramic dielectric material; and
a plurality of layers of metallic electrodes, one metallic electrode layer arranged between two layers of ceramic dielectric;
characterized in that the ceramic dielectric layers consist essentially of a monophase ceramic in the form of a mixed crystal of BaTiO$_3$ and 0.02 to 0.12 mol of the perovskite SrBi$_4$Ti$_4$O$_{15}$ for each mol of BaTiO$_3$.

12. A ceramic multilayer capacitor as claimed in claim 11, characterized in that the mixed crystal consists essentially of 0.03 to 0.06 mol SrBi$_4$Ti$_4$O$_{15}$ per mol of BaTiO$_3$.

13. A ceramic multilayer capacitor as claimed in claim 12, characterized in that the mixed crystal consists essentially of 0.03 to 0.04 mol SrBi$_4$Ti$_4$O$_{15}$ per mol of BaTiO$_3$.

14. A ceramic multilayer capacitor as claimed in claim 13, characterized in that the mixed crystal consists essentially of 0.03 mol SrBi$_4$Ti$_4$O$_{15}$ per mol of BaTiO$_3$.

* * * * *